No. 827,914. PATENTED AUG. 7, 1906.
I. KITSEE.
ELECTRIC BATTERY.
APPLICATION FILED JUNE 12, 1901. RENEWED MAY 3, 1905.
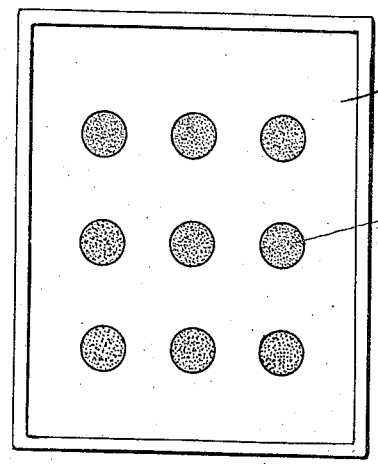
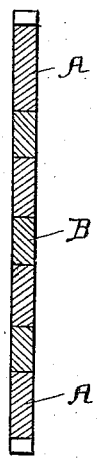
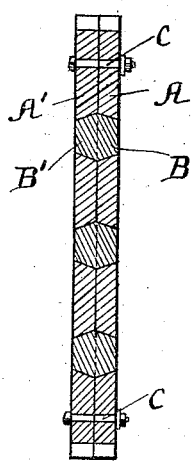
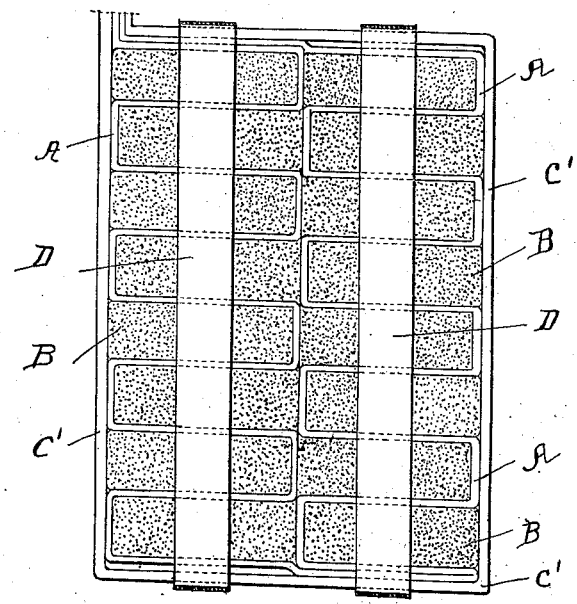
WITNESSES:
INVENTOR

UNITED STATES PATENT OFFICE.

ISIDOR KITSEE, OF PHILADELPHIA, PENNSYLVANIA.

ELECTRIC BATTERY.

No. 827,914.        Specification of Letters Patent.        Patented Aug. 7, 1906.

Application filed June 12, 1901. Renewed May 3, 1905. Serial No. 258,692.

*To all whom it may concern:*

Be it known that I, ISIDOR KITSEE, of the city and county of Philadelphia, State of Pennsylvania, have invented certain new and useful Improvements in Electric Batteries, (Case No. 128,) of which the following is a specification.

My invention relates to an improvement in electrodes for electric cells.

The object of my invention is to produce an electrode for electric cells—primary as well as secondary—adapted to produce the necessary depolarization without any depolarizing material being present in the liquid or without any high oxid being present in the electrode itself.

The chemical action due to the dissolving of the positive electrode in primary cells or due to the change from the metallic state to the state of a salt compound of the active material in secondary cells is well understood, and it suffices to say that the hydrogen liberated through the dissolving of the electrode or the change from the metallic state to the salt compound of the active material tends to polarize the electrode of the opposite sign. In primary cells depolarizing material—material capable of giving out oxygen—is therefore employed in conjunction with the electrolyte to counteract or neutralize the liberated hydrogen, and in secondary batteries the electrode is provided with a high oxid capable of combining with the hydrogen liberated as soon as the same strikes the surface of said electrode.

It is the aim of my invention to dispense with the depolarizing material usually employed in primary cells, as well as with the highly-oxidized material known as the "active" material in secondary cells.

The action of platinum in bringing about the condensation of gases through contact action on its surface was taken advantage of in the earlier days of electrical science; but on account of what seemed to be unsurmountable difficulties the practical application was abandoned.

In another application, filed May 23, 1901, under Serial No. 61,646, I have described an electrode consisting of carbon, the interstices of which are lined with finely-divided platinum; and this my invention has more special reference to electrodes provided with active material, consisting of charcoal or other porous carbon, provided as to its inner spaces with divided platinum, this active material placed in holes or perforations of the electrode proper or placed into spaces of a conductor adapted to be used as an electrode proper.

Referring to the drawings, Figure 1 is an elevation of an electrode embodying my invention. Fig. 2 is a sectional view of same. Fig. 3 is a sectional view of an electrode consisting of two independent plates connected together so as to form one electrode. Fig. 4 is an elevation embodying my invention in modified form.

A is the electrode or conductor proper.

B is the active material.

In Fig. 3, C is the connecting-rod to clamp together two conducting-plates, and in Fig. 4 C' is the non-conducting support for the electrode, and D represents the holders or bands keeping the whole electrode together.

If the electrode is in the shape as illustrated in Fig. 1, the same may consist of carbon or of any other suitable conductor provided with holes or perforations. In these holes or perforations are placed blocks of very porous carbon or blocks of what is practically the same—charcoal. The latter is preferred for the reason that it is very porous and it is capable of containing in its pores a great amount of platinum-black.

The process, as described in the application above referred to, can be also carried out to advantage in preparing the carbon plugs.

In Fig. 4 the active material consists of blocks or briquets of carbon or charcoal provided with finely-divided platinum. These blocks or briquets are separated from each other by and are in contact with a conducting-strip. This strip may consist of platinum or it may consist of any other conductor not injuriously affected by the electrolyte. If the electrode is used in a secondary cell with diluted sulfuric acid as electrolyte, the conducting-strip may consist of lead, and if the electrode is used in a secondary cell where the electrolyte consists of caustic alkali then the strip may consist of copper or other suitable metal. The non-conducting frame consists, preferably, of hard rubber, and the holders may preferably be in the shape of soft-rubber bands.

I have illustrated and described the active material as being contained in recesses of the conductor; but the conductor may consist of a solid plate, and the active material may consist of a block of carbon provided as to its inner spaces with finely-divided platinum.

The great advantage of such an electrode over the electrode as described in the specification above referred to lies therein that the small plugs or blocks may be removed at will, renovated, or repaired if out of order without destroying or taking out of the liquid for a great length of time the whole electrode. The plugs or blocks of active material can be made in such shape as to be interchangeable, and one may easily be removed if injured and replaced by another.

Having now described my invention, what I claim as new, and desire to secure by Letters Patent, is—

1. An electrode for electric cells, consisting of the conductor proper, said conductor provided with holes or spaces, and an active material contained in said holes or spaces, said active material consisting of platinized carbon.

2. An electrode for electric cells consisting of a conducting material shaped so as to provide a series of spaces or recesses and active material placed in said spaces or recesses, said active material consisting of porous carbon, the inner pores of which are lined with platinum in its finely-divided state.

3. In an electrode for electric cells, active material consisting of a series of independent blocks or plugs placed in the recesses with which said electrode is provided, said blocks or plugs consisting of a carbonaceous material provided with platinum in its finely-divided state.

4. An electrode for electric cells consisting of a conducting-strip bent so as to provide a series of spaces, independent blocks of depolarizing material placed in said spaces, said independent blocks consisting of a porous conducting material provided with platinum in its divided state.

5. An electrode for electric cells consisting of the following elements: a conductor formed so as to provide a series of spaces or recesses, independent blocks of active material placed in said spaces or recesses, each of said independent blocks consisting of a conducting material provided with platinum in its finely-divided state.

6. An electrode for electric cells consisting of the conductor proper formed so as to provide a series of spaces, independent blocks placed in said spaces, said independent blocks consisting of carbon provided with a second material, said second material capable of depolarizing through catalytic action.

7. An electrode for electric cells consisting of the following elements: a conductor shaped so as to provide a series of spaces or recesses, active material placed in said spaces or recesses, said active material consisting of two substances, one a porous conductor adapted to serve as carrier for the second substance, said second substance capable of depolarizing through catalytic action.

In testimony whereof I hereby sign my name, this 31st day of May, 1901, in the presence of two subscribing witnesses.

ISIDOR KITSEE.

Witnesses:
E. R. STILLEY,
W. B. ELDRIDGE.